(12) United States Patent
Laine et al.

(10) Patent No.: US 7,932,858 B2
(45) Date of Patent: Apr. 26, 2011

(54) SATELLITE POSITIONING METHOD AND SYSTEM

(75) Inventors: Robert Andre Laine, Paris (FR);
Hugues Favin-Leveque, Buc (FR);
Martin Ripple, St. Germain en Laye (FR)

(73) Assignee: Astrium SAS, Paris (FR)

( * ) Notice: Subject to any disclaimer, the term of this patent is extended or adjusted under 35 U.S.C. 154(b) by 313 days.

(21) Appl. No.: 12/122,687

(22) Filed: May 17, 2008

(65) Prior Publication Data

US 2008/0284644 A1 Nov. 20, 2008

(30) Foreign Application Priority Data

May 18, 2007 (FR) .................................... 07 03562

(51) Int. Cl.
*G01S 19/08* (2010.01)
(52) U.S. Cl. ................................................. 342/357.45
(58) Field of Classification Search ........... 342/357.01–357.17, 357.2–357.78
See application file for complete search history.

(56) References Cited

U.S. PATENT DOCUMENTS

| 5,430,657 | A |   | 7/1995  | Krytsos |
| 5,631,838 | A |   | 5/1997  | Ishikawa |
| 5,931,890 | A |   | 8/1999  | Suwa |
| 5,995,040 | A | * | 11/1999 | Issler et al. ............... 342/352 |
| 6,603,426 | B1 |  | 8/2003  | Clark |
| 7,106,863 | B2 | * | 9/2006 | Dujarric ..................... 380/258 |
| 2001/0009405 | A1 | * | 7/2001 | Chang et al. ........... 342/357.01 |
| 2004/0193373 | A1 |  | 9/2004 | Beauregard |

FOREIGN PATENT DOCUMENTS

FR 2 745 092 8/1997

OTHER PUBLICATIONS

Preliminary Search Report dated Dec. 19, 2007 w/ English translation.

* cited by examiner

*Primary Examiner* — Thomas H Tarcza
*Assistant Examiner* — Nga X Nguyen
(74) *Attorney, Agent, or Firm* — Dickinson Wright PLLC

(57) ABSTRACT

A satellite terrestrial positioning system is disclosed in which navigation satellites verify, in an autonomous manner, essential information that is transmitted to users using unidirectional links received from reference beacons.

13 Claims, 2 Drawing Sheets

US 7,932,858 B2

SATELLITE POSITIONING METHOD AND SYSTEM

TECHNICAL FIELD OF THE INVENTION

The present invention relates to satellite terrestrial positioning systems.

BACKGROUND OF THE INVENTION

It is known that satellite positioning systems comprise a constellation of navigation satellites placed in medium-altitude orbits (of the order of 25 000 km) around the Earth. These navigation satellites and their orbits are generally designated "MEO satellites" and "MEO orbits", respectively (Medium Earth Orbit) in the art. MEO satellites are distributed uniformly in several orbital planes, so that, at any point on the Earth, a user can see several MEO satellites, that is to say be in direct lines with them (at least three, but four if the user desires to ascertain his altitude) and deduce his own terrestrial coordinates therefrom.

Each MEO satellite carries an atomic clock of high stability and precision, as well as an electronic item of equipment which addresses to the terrestrial users a message comprising the corrected time (relative to a common reference) and the ephemerides of the satellite. On the basis of these messages received from several MEO satellites, the user determines his distance from the various satellites by visibility and therefore deduces therefrom his position in terrestrial coordinates. To ensure nominal operation of the constellation of MEO satellites, a terrestrial control centre performs the measurement of the orbit and of the onboard time for each MEO satellite. This control centre computes the ephemerides of the MEO satellites and the correction of the time to be broadcast by each MEO satellite for the forthcoming times.

The main drawback of these terrestrial-positioning systems is that the quality of the positioning of the terrestrial users is based on the quality of the ephemerides and of the corrected time broadcast by each MEO satellite. So, subsequent to a control centre error or a fault aboard an MEO satellite, it may happen that the real position, the corrected time and/or the ephemerides broadcast by one or more MEO satellites become false, thereby giving rise to a positioning error for all the users in the satellite visibility zone. The error will eventually be detected and corrected by the control centre which monitors the MEO satellites, but, meanwhile, certain users who are using the system for important functions, navigation for example, may be in a situation of serious insecurity.

Several solutions for changing the design of MEO satellites and slaving them to external time references so as to increase the reliability of the messages transmitted by MEO satellites have already been proposed. However, in all these solutions, the detection of anomalies in the MEO satellites is ensured by a network of ground monitoring stations, which transmit to the control centre an information cue regarding these anomalies, and the correction of the latter is entrusted to the said control centre. Additionally, to be effective, these solutions implement at least fifty monitoring stations permanently connected to the said control centre by multiple channels in parallel. This results in high installation and utilization costs.

Moreover, the detection of anomalies by a network of terrestrial monitoring stations gives rise to a strong dilution of precision in retrieving the position of the MEO satellites. Specifically, for a particular MEO satellite, all the distance measurements are performed from terrestrial stations which are therefore all located within a reduced solid angle because the diameter of the Earth is small with respect to the diameter of MEO orbits. The precision in the horizontal plane is consequently limited, correspondingly reducing the reliability in the instantaneous detection of anomalies.

Additionally, all the measurements performed by such a network of terrestrial monitoring stations are disturbed by local effects (tropospheric, ionospheric, multipath errors), thereby causing measurement errors which degrade the reliability of detecting anomalies and risk generating false alerts, if a tolerance threshold very close to these errors has been fixed.

An additional drawback of detecting anomalies by a network of terrestrial monitoring stations stems from the latency time between the moment when an anomaly arises in an MEO satellite and the instant when the user is finally warned of this anomaly. Specifically, the detection/notification chain includes the world network of stations, the control centre, which on the basis of all the measurements of the stations will detect the anomaly, the stations for broadcasting the alert message to the satellites and the system for repeating the alert message aboard the MEO satellite. This long and complex chain induces latency times between the occurrence of the anomaly and the notification to the users that are hardly compatible with the highest operational dependability requirements, such as for example those applicable in the aeronautical field.

SUMMARY OF THE INVENTION

The object of the present invention is to remedy these drawbacks.

To this end, according to the invention, the method for positioning a user on the Earth, the said method implementing a plurality of navigation satellites which are placed in medium-altitude orbits and which are managed by at least one terrestrial control centre, each of the said navigation satellites transmitting first time and position information which is individual to it, is noteworthy in that:

a plurality of reference beacons managed by the said terrestrial control centre and each able to transmit specific second time and position information as well as a specific radioelectric signal is distributed in space; and aboard each navigation satellite:

the said second time and position information transmitted is detected by at least some of the said reference beacons;

first values and second values respectively representative of the distances between the said navigation satellite and each of the said beacons and of the rate of variation of these distances are computed on the basis of the said first and second time and position information;

the variation in Doppler frequency appearing in the said radioelectric signals transmitted is measured by the said reference beacons;

third values and fourth values respectively representative of the distances between the said navigation satellite and each of the said beacons and of the rate of variation of these distances are computed on the basis of the said variations in Doppler frequency;

for each reference beacon, the said first distance value and the said third distance value, as well as the said second value of rate of variation of distance and the said fourth value of rate of variation of distance are compared;

a signal representative of the results of the said comparisons is generated; and the said navigation satellite transmits this comparison result signal to the said user, at least in the case where the said comparison reveals an anomaly.

Thus, by virtue of the present invention, each MEO navigation satellite is in unidirectional communication with the said transmitting beacons and can verify in an autonomous manner that the essential information that it transmits to the users is valid at each instant. If the verification is interrupted or if it reveals deviations with respect to this essential information, the navigation satellite concerned includes in the latter a message indicating that the said information is either suspect (cases in which the verification chain is interrupted or the deviation detected is significant but acceptable), or false. The users can therefore immediately either ignore the information originating from the corresponding navigation satellite, or reduce the weight allocated to the latter in the position computation.

The said reference beacons can, at least in part, be disposed on the Earth or, preferably, aboard satellites in high orbits (for example of the order of 40,000 km). In the latter case, it is advantageous that the said beacon carrier satellites be geosynchronous so as to constantly remain in view of the said control centre. In the case where the high orbits are not geosynchronous, several stations are provided, distributed around the Earth and linked to the said control centre.

In accordance with the present invention, an MEO satellite positioning system comprising a plurality of navigation satellites which are placed in medium-altitude orbits and which are managed by at least one terrestrial control centre, each of the said navigation satellites comprising an atomic clock, a receiver-decoder of telecommands transmitted by the said terrestrial control centre, a generator of first time and position information which is linked to the said clock and to the said receiver-decoder, and a transmitter transmitting the said first information to the said user, is noteworthy in that:

the said system comprises a plurality of reference beacons distributed in space and managed by the said terrestrial control centre, each beacon being able to transmit second time and position information, as well as a radioelectric signal; and each navigation satellite moreover comprises:
  means for receiving the said second information transmitted by at least some of the said reference beacons, the said reception means measuring the variation in Doppler frequency appearing in the said radioelectric signals transmitted by the said reference beacons;
  means for decoding the said second information received by the said reception means;
  computation means receiving the said second information decoded by the said decoding means, the said variations in Doppler frequency and the said first information transmitted by the said generator, the said computation means:
    computing the said first, second, third and fourth values on the basis of the said first and second information, on the one hand, and of the said variations in Doppler frequency, on the other hand;
    comparing, for each reference beacon, the said first distance value and the said third distance value, as well as the said second value of rate of variation of distance and the said fourth value of rate of variation of distance; and
    addressing the results of the comparisons to the said generator so that the latter possibly incorporates them into the said first information.

The decision logic applied by the computation means to determine the quality and the security of the navigation data can be the following:

if everything is consistent within predetermined prescribed limits, then the computation means signal this fact to the navigation frame generator of the MEO satellite which incorporates into the navigation information dispatched to the users a message signalling that the MEO satellite positioning data are correct, if the link with the beacons is poor (not enough beacons available or poor link budget), then the data are in doubt and the computation means signal this fact to the navigation frame generator (the first information) which incorporates into the navigation information dispatched to the users a message signalling that the quality of the MEO satellite positioning data is non-validated and therefore doubtful, finally, if the Doppler signals received from the beacons and/or the distance of the MEO satellite from these beacons are inconsistent with the MEO satellite navigation data, then the computer signals this fact to the navigation frame generator (the first information) which incorporates into the navigation information dispatched to the users an alert message signalling that the MEO satellite positioning data are false.

The said first information addressed to the said computation means can be sampled directly at the output of the said generator of the first information. However, so as to ensure that the quality of the signal ultimately transmitted is good, it is possible moreover to provide, in each navigation satellite, an auxiliary receiver-decoder for receiving and decoding the said first information transmitted by the said transmitter, the said auxiliary receiver-decoder addressing the said first information to the said computation means.

The present invention moreover comprises a navigation satellite such as described above.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
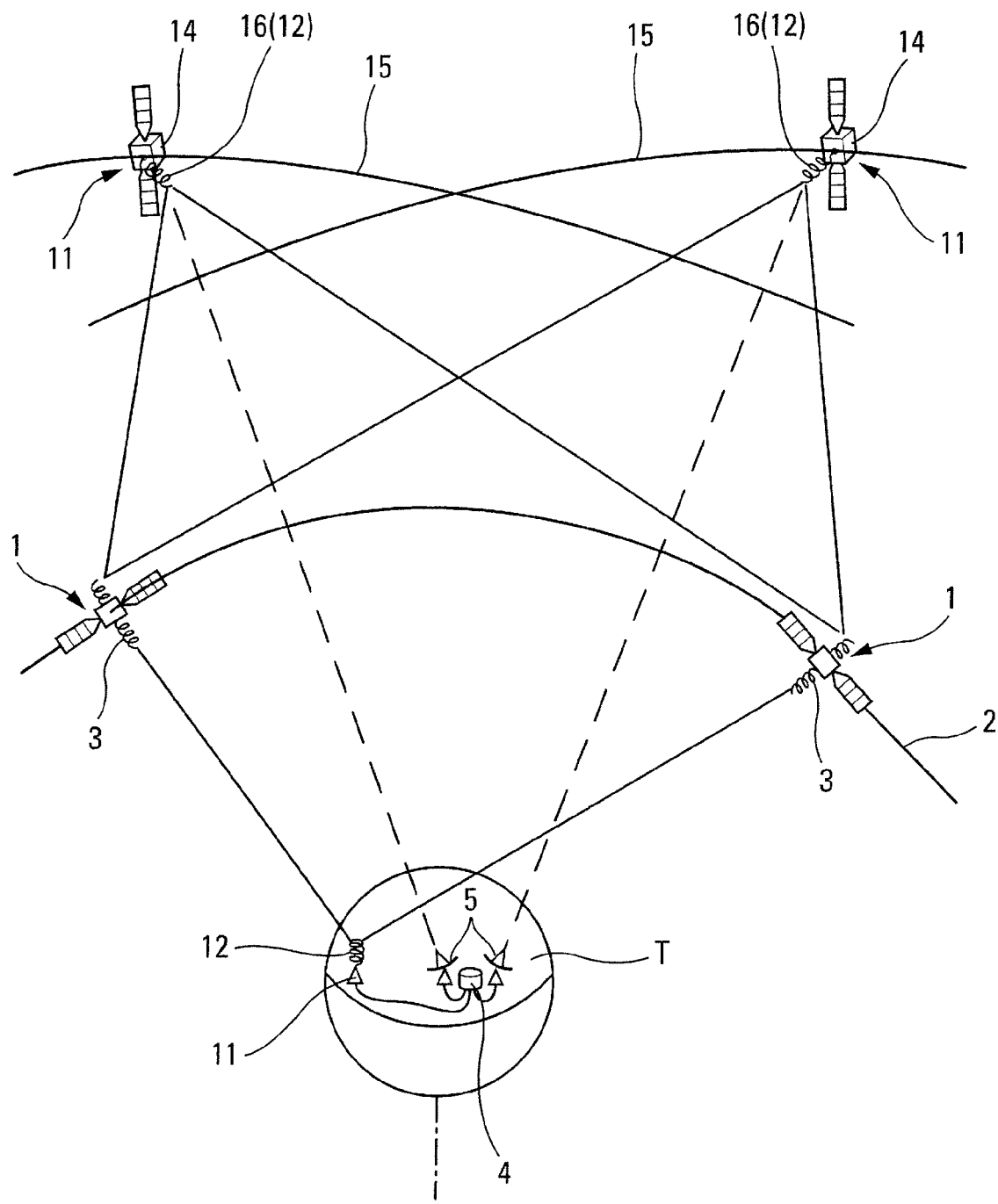
FIG. 1 is a diagrammatic and partial view of the satellite positioning system in accordance with the present invention.

The satellite positioning system represented schematically and partially in FIG. 1, comprises:

navigation satellites 1, termed MEO satellites, describing medium-altitude orbits 2 (MEO orbits) about the Earth T and equipped with antenna systems 3; and a terrestrial control centre 4, equipped with a system of antennas 5.

In a known manner, on board each MEO satellite 1 is an electronic item of equipment 6 (see FIG. 2) able to receive, through the appropriate part 3.1 of the antenna system 3, telecommands transmitted by the control centre 4, and to transmit, through the appropriate part 3.2 of the antenna system 3, positioning signals to users situated on the Earth T. In a likewise known manner, the said electronic item of equipment 6 comprises a receiver-decoder of the telecommands 7 linked to the antenna part 3.1, an atomic clock 8, a generator of navigation frames 9 receiving the signals from the receiver-decoder 7 and the clock 8 and a radio transmitter 10 receiving the navigation frames (corrected time and ephemerides) from the generator 9 and addressing them to the users through the antenna part 3.2.

In accordance with the present invention, the satellite positioning system of FIG. 1 moreover comprises reference beacons 11, equipped with antennas 12 for transmitting a radio carrier with a message comprising their position (in three-dimensional coordinates or in the form of ephemerides) and a temporal reference signal, repeated at a recurrence frequency that is greater than the transmission cycle of the signals transmitted by the satellites 1 to the Earth T.

The reference beacons 11 are disposed either on the Earth T, or aboard satellites 14 describing high orbits 15. In the latter case, the antennas 12 of the reference beacons 11 constitute a part of the antenna systems 16 of the satellites 14.

The signals transmitted by the reference beacons 11, by way of the antennas 12, are managed and synchronized by the terrestrial control centre 4.

In accordance with the invention, the signals coming from the reference beacons 11 are used by the satellites 1 to validate the signals that they themselves transmit to the terrestrial users.

Figure 2:
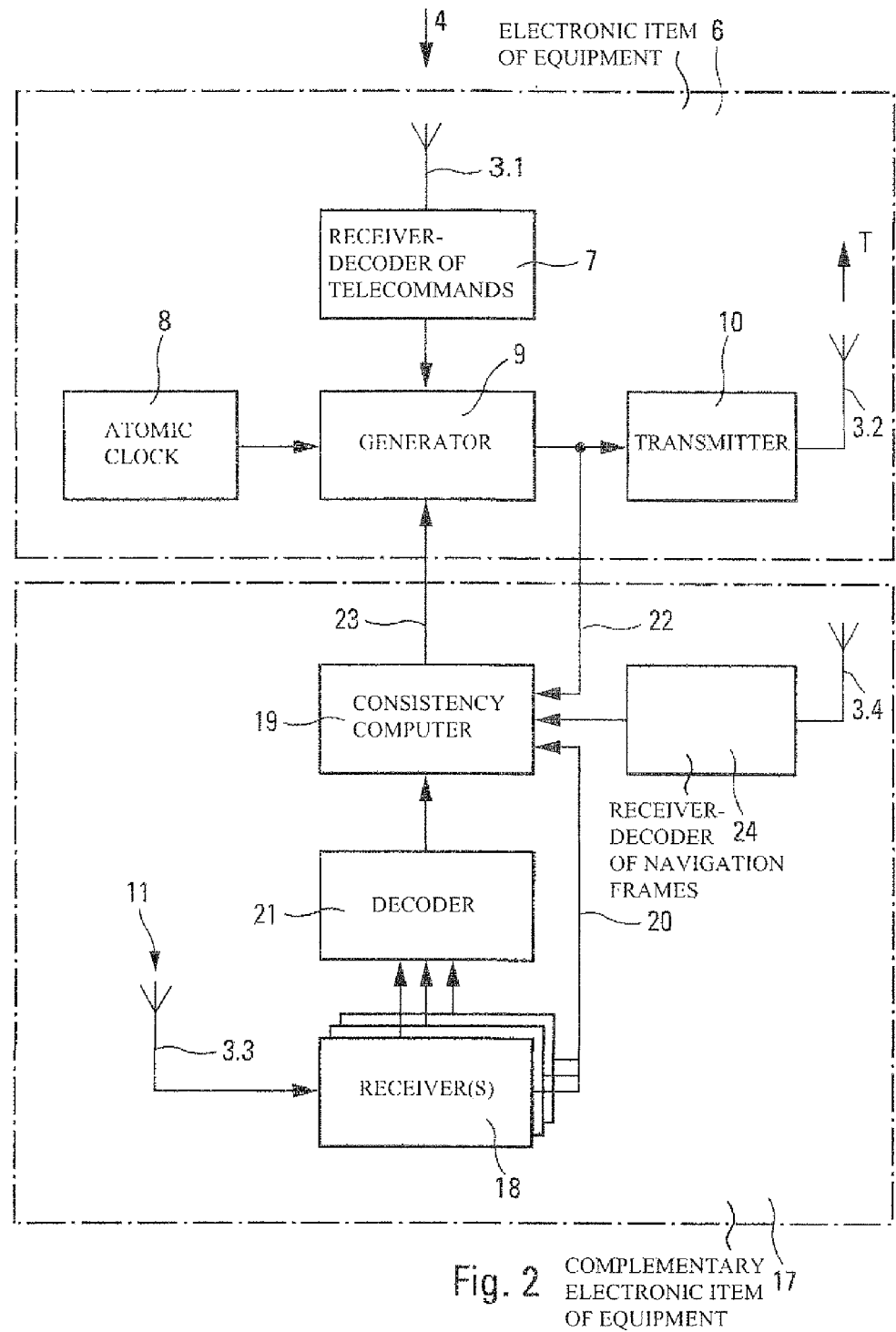
FIG. 2 is the schematic diagram of the electronic equipment of a navigation satellite in accordance with the present invention.

To this end, as illustrated schematically in FIG. 2, to the electronic item of equipment 6 mounted aboard each satellite 1 is appended a complementary electronic item of equipment 17 receiving the signals from the beacons 11 through an appropriate part 3.3 of the antenna system 3 of the said satellite 1.

The electronic item of equipment 17 comprises receivers 18 receiving the said signals from the beacons 11 by way of the said antenna part 3.3. The receivers 18 measure the Doppler signals of the radio frequencies transmitted by the various reference beacons 11 and address these Doppler signals to a consistency computer 19 through a link 20. Moreover, the receivers 18 address the data received from the reference beacons 11 to a decoder 21. The said decoder 21 extracts the position and time information received from the said reference beacons 11 and addresses it to the said consistency computer 19.

Additionally, through a link 22, the consistency computer 19 receives the navigation frames generated by the generator 9 of the electronic item of equipment 6. Thus, the consistency computer 19:

computes, for the satellite 1 which carries it, the distances from the various reference beacons 11, as well as the rate of variation of these distances, by taking into account, on the one hand, the latters' decoded position and time information delivered by the decoder 21 and, on the other hand, the corrected onboard time and the ephemerides originating from the said generator of navigation frames 9;

verifies that these distances and rates of variation of distances computed are consistent with the Doppler signals measured by the receivers 18; and transmits the result of this consistency verification to the generator of navigation frames 9 through the link 23.

In FIG. 2 is moreover represented a receiver-decoder of navigation frames 24, provided with a reception antenna 3.4, forming part of the antenna system 3. The receiver-decoder 24 is able to pick up the navigation frames transmitted by the radio transmitter 10, by way of its antenna 3.2, and to send them to the consistency computer 19. The receiver-decoder 24 is therefore able to replace and/or supplement the link 22.

The invention claimed is:

1. A method for positioning a user on Earth, using a plurality of navigation satellites which are placed in medium-altitude orbits and which are managed by at least one terrestrial control center, comprising:

transmitting first time and position information from each of said navigation satellites;

managing a plurality of reference beacons by said terrestrial control centre, each of the reference beacons configured to transmit second time and position information and distribute a radioelectric signal in space; and aboard each of said navigation satellites:

detecting said second time and position information transmitted by at least one of said reference beacons;

computing first values and second values, respectively, representative of distances between said navigation satellite and each of said beacons and of a rate of variation of the distances based on said first and second time and position information;

measuring a variation in Doppler frequency appearing in said radioelectric signals transmitted by said reference beacons;

computing third values and fourth values, respectively, representative of the distances between said navigation satellite and each of said beacons and of the rate of variation of the distances based on said variations in Doppler frequency;

comparing, for each reference beacon, said first values and said third values, and said second values of rate of variation of distance and said fourth values of rate of variation of distance;

generating a signal representative of results of said comparisons; and transmitting via said navigation satellite the result signal to said user, at least when said comparisons reveal an anomaly.

2. The method of claim 1, wherein at least one of the reference beacons is located on the Earth.

3. The method according to claim 1, wherein at least one of the reference beacons is located aboard high orbit satellites.

4. The method of claim 3, wherein the high orbit satellites are geosynchronous.

5. A system of positioning a user on Earth, comprising:

a plurality of navigation satellites placed in medium-altitude orbits and managed by at least one terrestrial control center, each of said navigation satellites comprising an atomic clock, a receiver-decoder of telecommands transmitted by said terrestrial control center, a generator of first time and position information which is linked to said atomic clock and to said receiver-decoder, and a transmitter transmitting said first information to said user;

a plurality of reference beacons distributed in space and managed by said terrestrial control center, each beacon configured to transmit second time and position information and a radioelectric signal; and each navigation satellite comprises:

a receiver for receiving said second information transmitted by at least one of said reference beacons, said receiver measuring a variation in Doppler frequency appearing in said radioelectric signals transmitted by said reference beacons;

a decoder for decoding said second information received by said receiver;

a computation unit receiving said second information decoded by said decoder, said variations in Doppler frequency and said first information transmitted by said generator of the first information, said computation unit;

computing first, second, third and fourth values based on one of said first and second information, and of said variations in Doppler frequency;

comparing, for each reference beacon, said first value and said third value, and said second value of rate of variation of distance and said fourth value of rate of variation of distance; and addressing results of the comparisons to said generator for incorporation into said first information.

6. The system according to claim 5, wherein said first information addressed to the said computation unit is sampled at an output of said generator of the first information.

7. The system according to claim 5, wherein each navigation satellite further comprises an auxiliary receiver-decoder for receiving and decoding said first information transmitted by said transmitter, said auxiliary receiver-decoder addressing said first information to said computation unit.

8. A navigation satellite for use in a positioning system, comprising:

an atomic clock, a receiver-decoder of telecommands transmitted by a terrestrial control center, a generator of first time and position information which is linked to said atomic clock and to said receiver-decoder, and a transmitter transmitting said first information to said user, and said positioning system comprising:

a plurality of reference beacons located in space and managed by said terrestrial control center, each beacon configured to transmit second time and position information, and a radioelectric signal, wherein the navigation satellite further comprises:

a receiver for receiving said second information transmitted by at least one of said reference beacons, said receiver measuring a variation in Doppler frequency appearing in said radioelectric signals transmitted by said reference beacons;

a decode for decoding said second information received by said receiver;

a computation unit receiving said second information decoded by said decoder, said variations in Doppler frequency and said first information transmitted by said generator of the first information, said computation unit;

computing said first, second, third and fourth values based on at least one of said first and second information, and of said variations in Doppler frequency;

comparing, for each reference beacon, said first value and said third value, and said second value of rate of variation of distance and said fourth value of rate of variation of distance; and addressing results of the comparisons to said generator for incorporation into said first information.

9. The navigation satellite according to claim 8, wherein said first information addressed to said computation unit is sampled at an output of said generator of the first information.

10. The navigation satellite according to claim 8, further comprising an auxiliary receiver-decoder for receiving and decoding said first information transmitted by said transmitter, said unit.

11. The system of claim 5, wherein at least one of the reference beacons is located on the Earth.

12. The system of claim 5, wherein at least one of the reference beacons is located aboard high orbit satellites.

13. The system of claim 5, wherein the high orbit satellites are geosynchronous.

* * * * *